United States Patent
Mowery et al.

[11] Patent Number: 5,914,460
[45] Date of Patent: Jun. 22, 1999

[54] WEATHERPROOF ENCLOSURE

[75] Inventors: Daniel L. Mowery, Gahanna; James G. Sepelak, Bellefontaine, both of Ohio

[73] Assignee: Siemens Energy & Automation, Inc., Alpharetta, Ga.

[21] Appl. No.: 09/026,346

[22] Filed: Feb. 19, 1998

[51] Int. Cl.[6] ............................. H02G 3/08; H05K 5/06
[52] U.S. Cl. .................. 174/50; 174/17 CT; 220/3.94
[58] Field of Search ................. 174/50, 50.5, 17 CT; 220/3.92, 3.94, 4.02

[56] References Cited

U.S. PATENT DOCUMENTS

| | | |
|---|---|---|
| Re. 34,113 | 10/1992 | Miller et al. . |
| D. 305,327 | 1/1990 | Newmark et al. . |
| D. 337,311 | 7/1993 | Perzan et al. . |
| D. 360,620 | 7/1995 | Gehrs et al. . |
| D. 380,198 | 6/1997 | Clark et al. . |
| 1,463,908 | 8/1923 | Platt . |
| 1,521,553 | 12/1924 | Getchell . |
| 2,603,546 | 7/1952 | Lais . |
| 3,056,009 | 9/1962 | Mrenna . |
| 3,101,226 | 8/1963 | Cochran, Jr. . |
| 3,343,041 | 9/1967 | Pistey et al. . |
| 3,386,606 | 6/1968 | Pastrick ................................. 220/3.94 |
| 3,752,900 | 8/1973 | Harrison et al. ....................... 174/50 X |
| 3,895,179 | 7/1975 | Wyatt . |
| 3,912,348 | 10/1975 | Seymour . |
| 4,291,817 | 9/1981 | Spitzer et al. . |
| 4,489,300 | 12/1984 | Hollenstein et al. . |
| 4,517,231 | 5/1985 | May et al. . |
| 4,658,422 | 4/1987 | Sparks . |
| 4,688,146 | 8/1987 | Newmark et al. . |
| 4,851,963 | 7/1989 | Miller et al. . |
| 4,890,318 | 12/1989 | Crane et al. . |
| 4,973,797 | 11/1990 | Jorgensen et al. . |
| 5,011,033 | 4/1991 | Roth ..................................... 220/3.94 |
| 5,065,878 | 11/1991 | Altmann et al. . |
| 5,076,455 | 12/1991 | Begley . |
| 5,232,277 | 8/1993 | Cassady et al. . |
| 5,238,133 | 8/1993 | Cox . |
| 5,310,075 | 5/1994 | Wyler . |
| 5,323,454 | 6/1994 | Shay et al. . |
| 5,434,376 | 7/1995 | Hyatt et al. . |
| 5,435,453 | 7/1995 | Higuchi . |
| 5,473,129 | 12/1995 | Markowski et al. . |
| 5,568,362 | 10/1996 | Hansson . |

*Primary Examiner*—Dean A. Reichard
*Attorney, Agent, or Firm*—Ira Lee Zebrak

[57] ABSTRACT

A Weatherproof Enclosure for electric load centers, switches, or other electrical components. The weatherproof enclosure includes a main enclosure base, two enclosure endcaps, and a hingeably mounted cover door for providing access to the interior of the weatherproof enclosure.

9 Claims, 7 Drawing Sheets

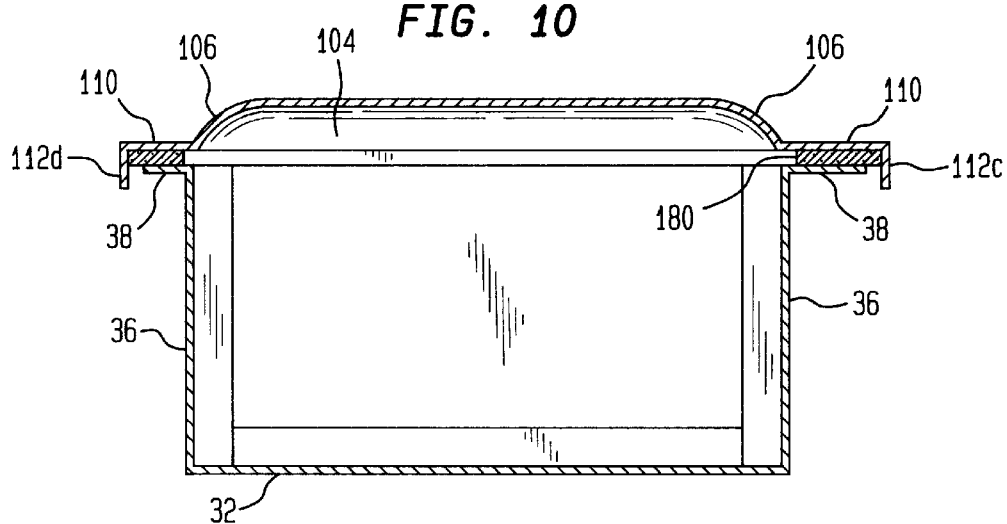
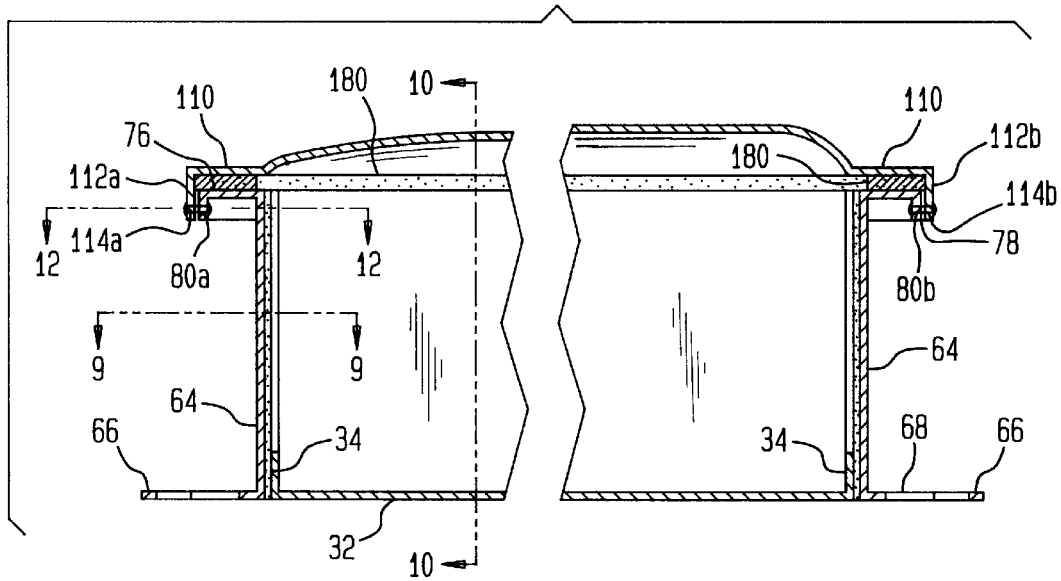
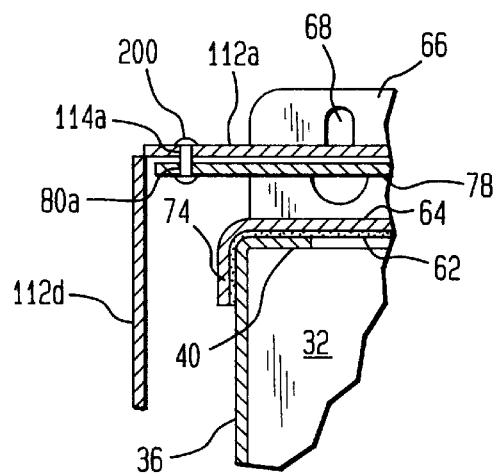

WEATHERPROOF ENCLOSURE

FIELD OF THE INVENTION

The present invention relates generally to the housings of electric load centers, switches and other electrical components, and more particularly to an improved enclosure which is weatherproof and complies with environmental qualifications and standards for interior and exterior residential and commercial use.

BACKGROUND OF THE INVENTION

Enclosures or housings for electric load centers, switches and other electrical components suffer from a number of limitations, including withstanding loading from environmental forces and difficulty in passing environmental qualification testing. Enclosures are intended to isolate and protect electrical equipment positioned within their confines from external environmental conditions such as dust, rain, oil, hose directed water and other environmental qualification design bases specified in industry standards and in Underwriters Laboratories standards such as UL-50 "Standards For Enclosures For Electrical Equipment.",1997. The enclosure is also intended to enable the user from outside the enclosure to activate, deactivate, or otherwise operate electrical equipment within it by engaging an internally positioned activating or disconnect mechanism (from an ON to OFF position and vice versa). Most importantly, the operation of the external handle cannot cause injury to the operator due to an electrical short or other abnormal condition caused by a failure of the environmental qualifications of the enclosure. The externally positioned handle which penetrates the wall of the enclosure to engage the internally positioned disconnect mechanism must also withstand the above-mentioned environmental loadings and qualification standards.

The prior art enclosures use a "standard" switch box enclosure and apply gasketing and sealants on the very edges of the enclosure (constituting the thickness of the material making up the enclosure) in an attempt to environmentally qualify the enclosure. The gasketing would be placed in contact with the cover or door when closed in an attempt to prevent the elements or contaminants from entering during its design lifetime. Thus, the function of the cover/door in the prior art standard enclosures is, in part, to provide strength, and protection from the elements and contaminants by pressing against a gasket positioned on the edges of the enclosure when the cover/door is closed. However, during the course of performing a Research and Development Program on developing and manufacturing a new and improved weatherproof enclosure, testing disclosed that when the above-described cover/door of the prior art standard enclosures was closed, it indented the gasket positioned on the edges of the box or enclosure to such a degree that the gasket or seal elastic limits were exceeded and also caused the seal to "pucker up", i.e. to be displaced or pushed off the edges of either or both of the base and the endcaps. Even when the elastic limits of the gasketing material was not initially exceeded by the operation of the cover/door, the gasket nonetheless lost its resilience over time as well as puckered up off the edge of the base and endcaps. The edges upon which the gasket was adhered would ultimately cause it to fail by cutting it during the repeated opening/closing cycles of the cover/door.

Further testing performed during the Research and Development Program revealed that the use of the prior art "flat" door/cover actually promoted the subsequent failure of the prior art enclosures when subjected to the industry standard test of the impingement of water flow from a high pressure hose. These failures occurred regardless of whether the gasketing material had earlier failed, or failed during the high pressure hose-down, or had not failed at all. More specifically, the cover deflected or deformed inward due to the force of the high pressure stream of water impinging upon the door/cover, thereby creating an internal partial vacuum which promoted water ingress into the enclosure. The environmental failure of the enclosure was caused by the ingress of water either through a breach in the gasketing that had failed, or the ingress of water around the gasketing that had puckered up and off, or by the ingress of water that had been vacuum pulled past non-failed gasketing into the interior of the enclosure.

A related problem of the prior art enclosure designs disclosed during the Research and Development Program, is that the methods of securing the endcaps of enclosures to the base of the enclosure typically are the source of the environmental failure of the enclosure due to the ingress of moisture and water. In some of the prior art designs, the edges of the endcaps at the location where they are mounted to the enclosure are typically welded together and therefore subject to subsequent failure during loading. If a sealant alone was used or was used together with welding, the sealant was so positioned or applied so as to be directly accessible from the interior and/or the exterior of the enclosure. By being directly accessible, the sealant was thereby subject to potentially accidental tearing or ripping during for example installation of interior components, wiring, maintenance, or repair. Thus, this type of design in the prior art further contributes to the environmental failure of the enclosure from the ingress of moisture and water and thereby subjecting the internal electrical components to catastrophic failure. Thus, the prior art designs included few if any design features to resist failure from environmental loading.

As is typical in many other prior art designs as discovered during the Research and Development Program, the cover/door frequently was not in proper alignment with the enclosure due to several possible causes including misalignment of hinges due to manufacturing tolerances, assembly inaccuracies, and imprecise riveting or welding or other mechanical means of affixing the hinges or other mechanisms to the cover/door and/or the enclosure. Such misalignment sometimes resulted in the rejection of the enclosure during manufacture due to quality control requirements/standards, or caused the environmental failure during its operating life. Such failures typically result from, and include, direct leakage into the enclosure through gaps between the enclosure and/or cover/door due to misalignment and failure of gasketing material intended to seal the cover/door due to tearing, displacement, or cutting due to improper compression from non-uniform pressure caused when the misaligned cover/door is closed against the enclosure.

SUMMARY OF THE INVENTION

In accordance with one aspect of the invention a weatherproof enclosure is provided for electrical load centers, switches or electrical components comprising a main enclosure base, two enclosure endcaps, and a hingeably mounted cover door for providing access into the interior of the weatherproof enclosure wherein the main enclosure base includes a generally U-shaped member having a bottom and opposing longitudinally extending sidewalls bent up from the edges of and extending orthogonally upward from the base forming an enclosure with an open top, the opposing longitudinally extending sidewalls having an outwardly extending flange extending orthogonally from the sidewalls and formed from bending over a top portion of the sidewalls, the sidewalls and the base have edges having inwardly bent flanges at each of their ends each one of the two enclosure endcaps are positioned at an end of the main enclosure base and having a wall with a top edge a bottom edge and two side edges where the side edges are bent in at their ends to form side flanges having an inner face and an outer face. The top edge is bent over to form a laterally extending flange extending in an opposite direction to the side flanges, the end of said laterally extending flange being bent to form a downwardly extending return flange orthogonal to the laterally extending flange, the downwardly extending return flange having an endcap hinge pin aperture for alignment with a correspondingly positioned cover hinge pin aperture, the bottom edge of the endcap being outwardly bent to form an outwardly extending flange having a mounting hole for securing the weatherproof enclosure to an installation location.

The hingeably mounted cover door has an exterior surface having an elevated generally rectangular face substantially parallel to the bottom and connected to a flat planar rim at two of its borders by ribs, and connected to the flat planar rim at a third edge by a first shoulder having a curved shape, the generally rectangular face connected to a gradually sloping surface at a fourth edge, the first shoulder being connected at two opposite sides to the flat planar rim by the ribs, the gradually sloping surface being connected on two of its sites to the flat planar rim by the ribs and being connected on a fourth side by a second gradually sloping surface connected on two of its sides to the flat planar rim by the ribs and being connected on a fourth side by the flat planar rim, the flat planar rim being bent over at its outer edges to form door return flanges which extend around the perimeter of the rim. Two of the door return flanges each have a cover hinge pin aperture which align with each of the two endcap hinge pin apertures and through each extend a rivet. The door return flanges are dimensioned to overlap the outwardly extending flanges of the sidewalls of the base and the downwardly extending return flanges of the endcaps.

The cover door further has a gasket affixed to an inside surface of the rim which extends to the door return flanges in order to form a weatherproof seal around the base and endcaps when the hingeably mounted cover is closed.

BRIEF DESCRIPTION OF THE DRAWINGS

FIG. 10 is a vertical sectional view taken along line 10—10 of the Weatherproof Enclosure shown in FIG. 11;

FIG. 11 is a vertical sectional view taken along line 11—11 of the Weatherproof Enclosure shown in FIG. 1; and FIG. 12 is an enlarged sectional view taken along line 12—12 of the Weatherproof Enclosure shown in FIG. 11;

DETAILED DESCRIPTION

In accordance with the present invention, a novel and improved Weatherproof Enclosure 10 is provided which protects the user from the internal electrical components within the enclosure and isolates those components from contaminants such as dust, oil, water, and ice. Externally positioned handle 160 serves to activate, deactivate, or otherwise operate electrical equipment the enclosure by engaging an internally positioned activating or disconnect mechanism from an ON to an OFF position and vice versa.

Weatherproof Enclosure 10 isolates and protects electrical equipment positioned within its confines from external environmental conditions such as dust, rain, oil, and hose directed water, and other environmental qualifications and design bases specified in industry standards and in Underwriter Laboratories standards such UL-50.

Figure 1:
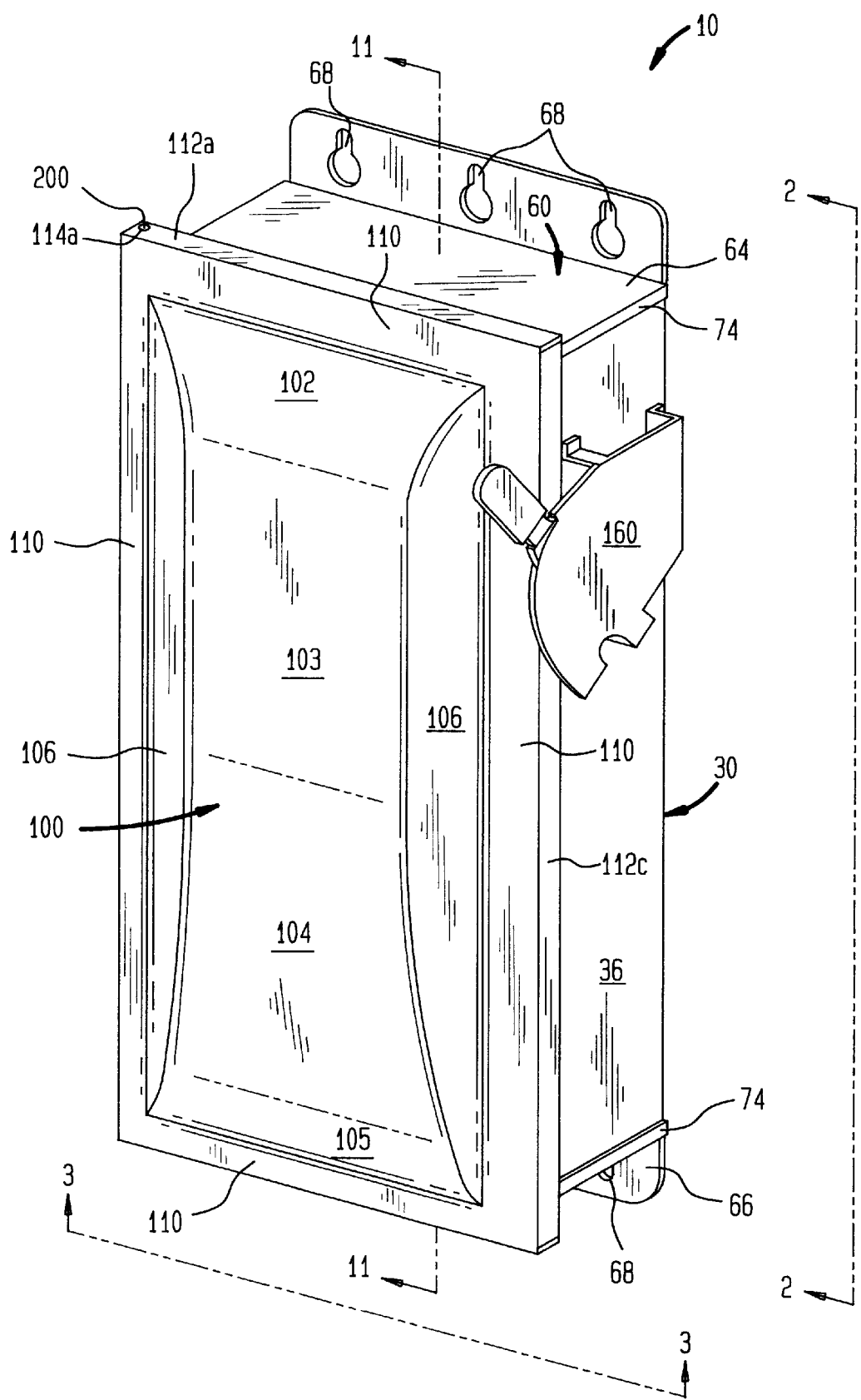
FIG. 1 is a perspective view of the Weatherproof Enclosure in accordance with the present invention.
Figure 2:
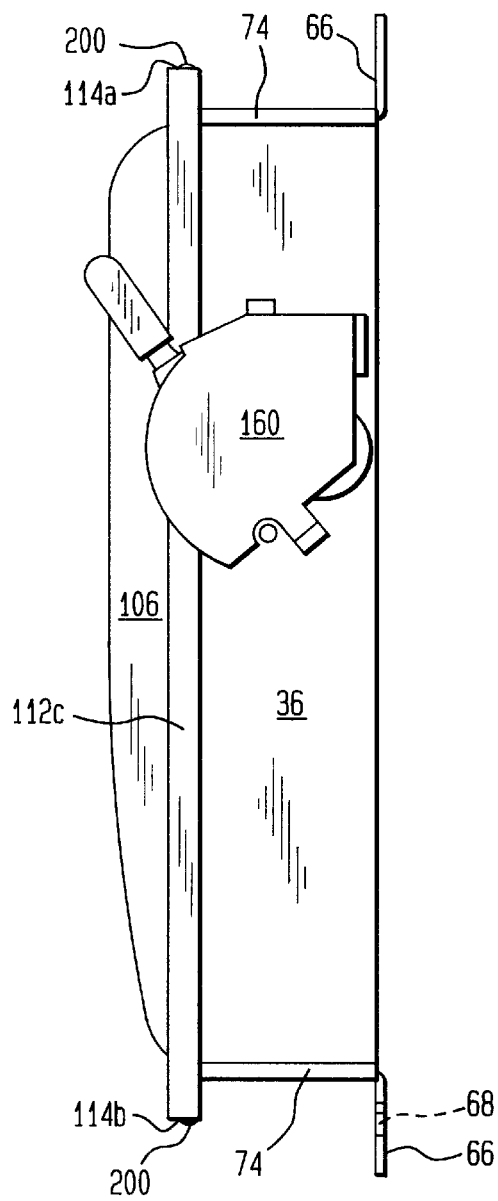
FIG. 2 is a side view taken along line 2—2 of the Weatherproof Enclosure shown in FIG. 1.
Figure 3:
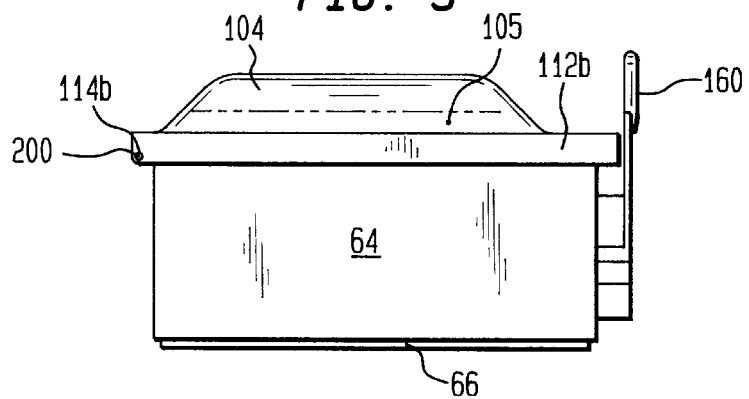
FIG. 3 is a bottom view taken along line 3—3 of the Weatherproof Enclosure shown in FIG. 1.

In accordance with the present invention, and referring to FIG. 1, Weatherproof Enclosure 10 comprises a main enclosure base 30, enclosure endcaps 60, a cover/door 100 (either with or without a window) and shown in FIG. 1 without a window. Cover/door 100 also functions as a door to gain access to the interior of the enclosure.

Figure 6:
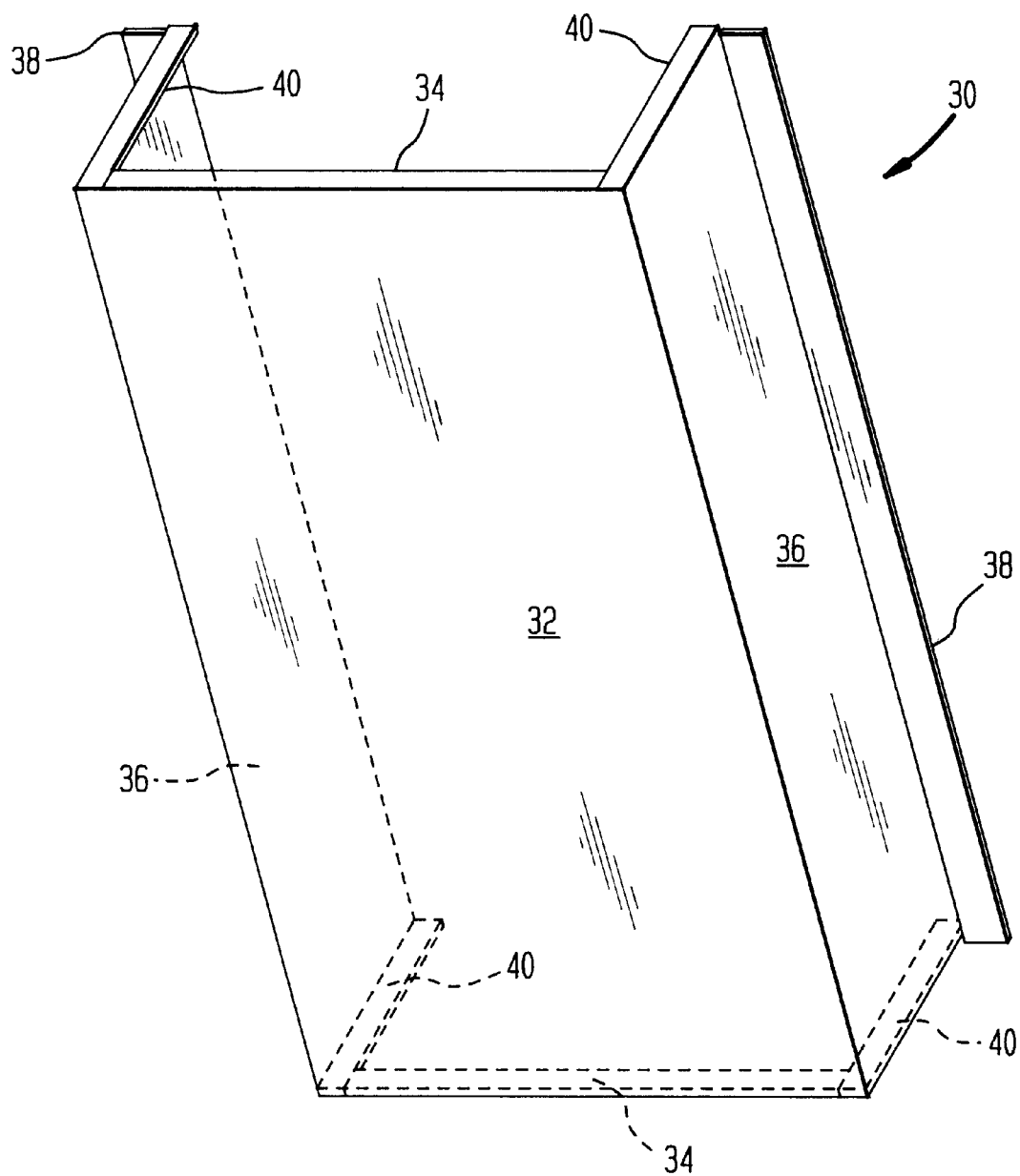
FIG. 6 is a perspective view of the base of the Weatherproof Enclosure shown in FIG. 1.
Figure 7:
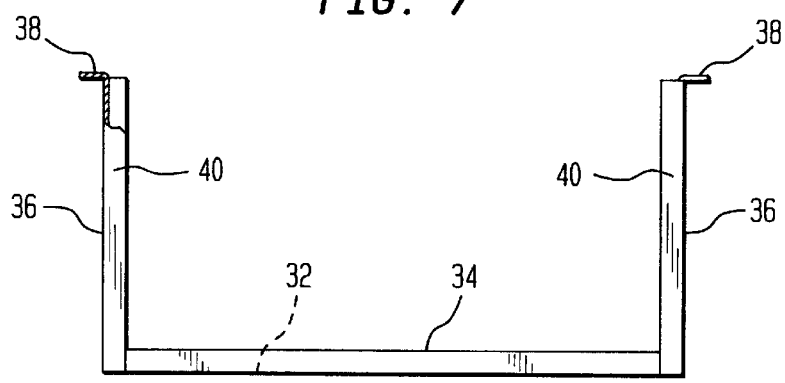
FIG. 7 is an end view of the base shown in FIG. 6.

Weatherproof Enclosure 10 comprises a flange box design (FIG. 6) coupled with endcaps (FIG. 8) which seal the interior of the enclosure. Referring to FIGS. 1, 6 and 7, the walls and bottom of enclosure 10 are integrally formed from a "U"-shaped base 30 including a bottom 32 and longitudinally extending sidewalls 36 which are bent up from the edges of base 30. Extending outwardly from the top of each sidewall 36 is an outwardly extending flange 38 formed from bending over a top portion of sidewall 36. At the edges of the two sidewalls 36 and base 32 are inwardly bent flanges 40 and 34, respectively. These flanges (34,40) as described more fully below aid in providing an environmentally qualified enclosure.

Figure 4:
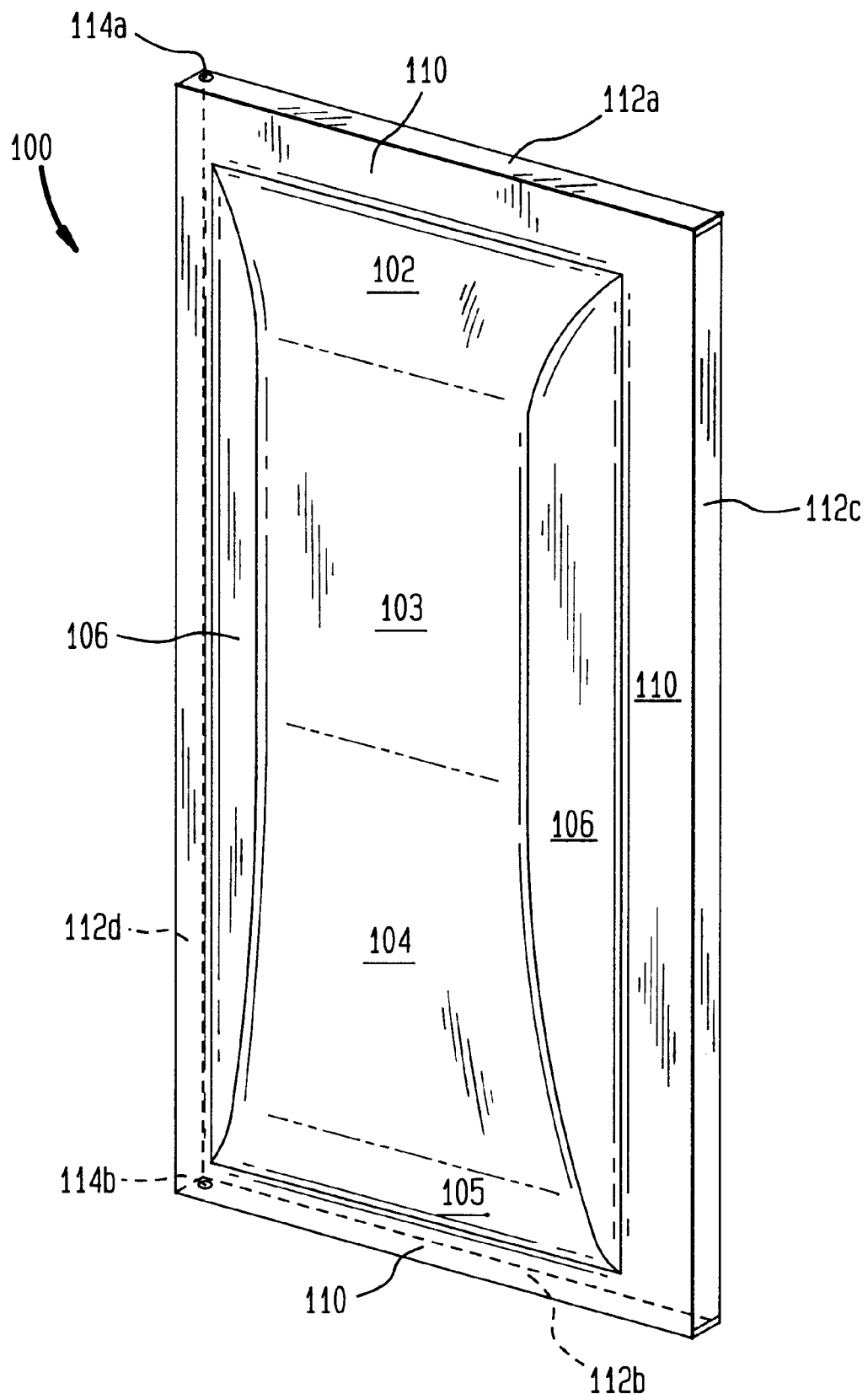
FIG. 4 is an isolated perspective view of the outside of the cover/door of the Weatherproof Enclosure shown in FIG. 1.
Figure 5:
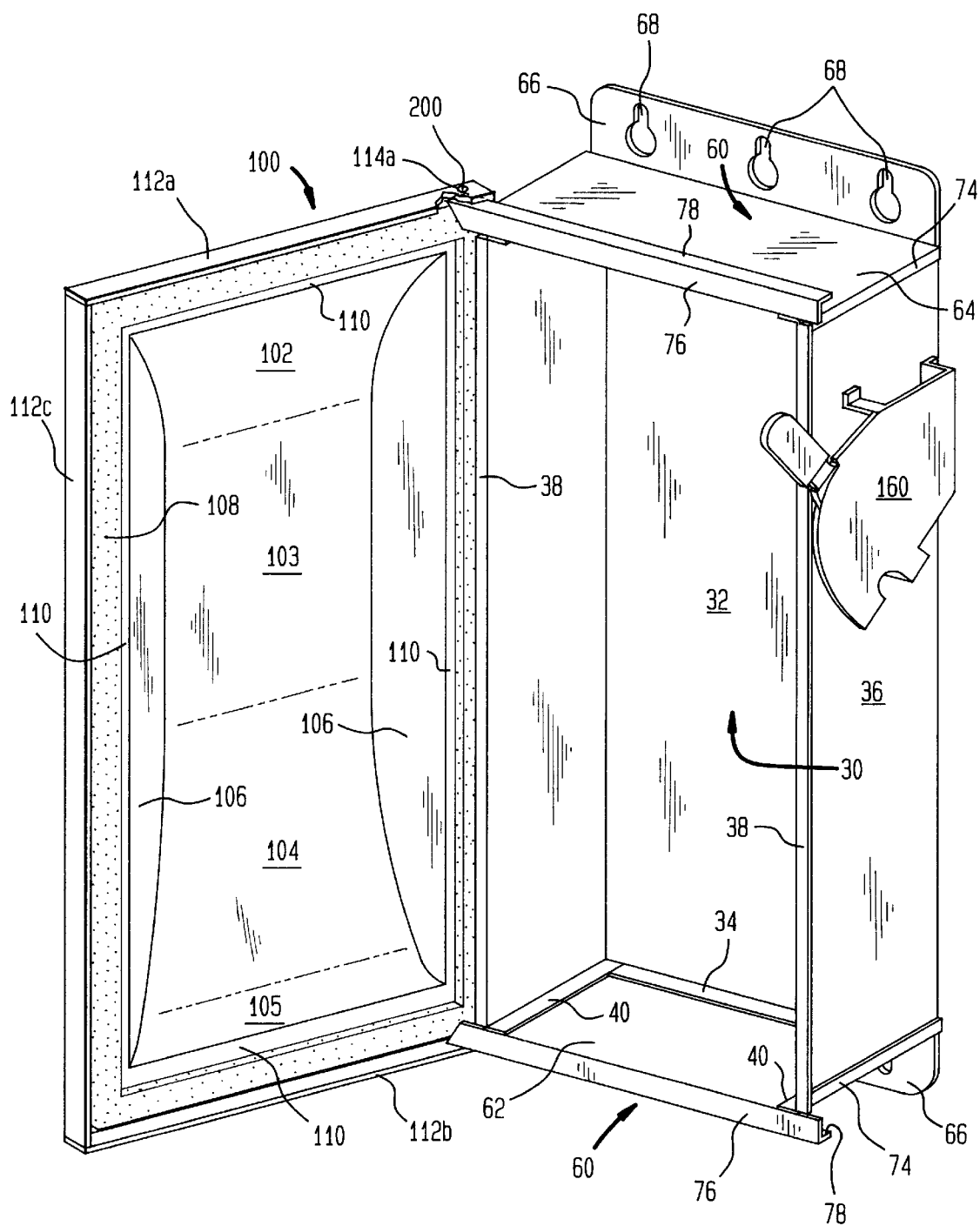
FIG. 5 is a perspective view of the Weatherproof Enclosure shown in FIG. 1 with the cover/door open showing the interior of the cover/door and the enclosure.
Figure 8:
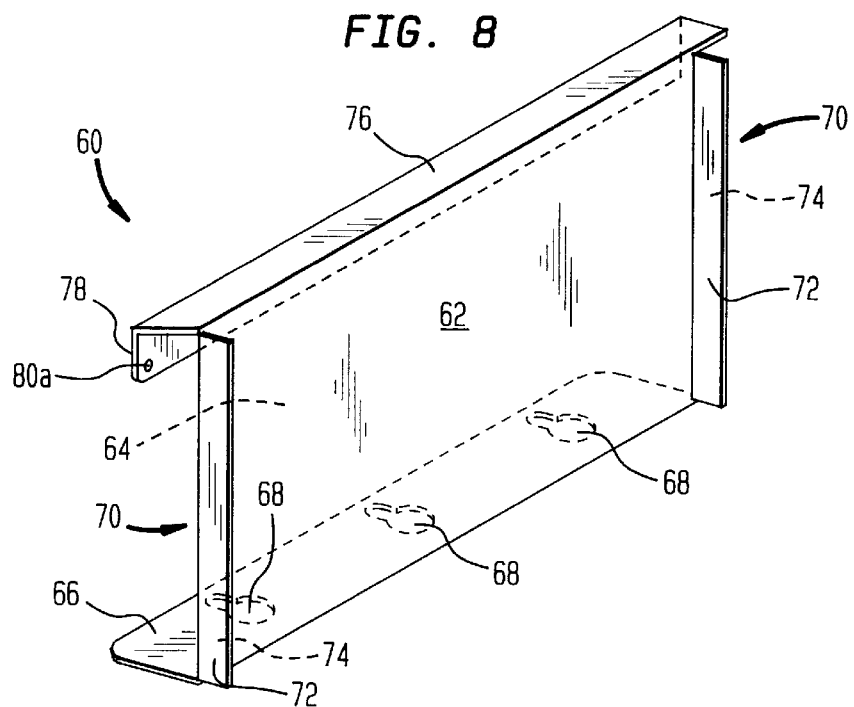
FIG. 8 is a perspective view of one of the two endcaps of the Weatherproof Enclosure shown in FIG. 1.

Enclosure endcaps 60 are shown in FIGS. 1 and 5 assembled to enclosure base 30. Referring to FIG. 8 which is an isolated view, each endcap 60 includes a wall having an inner face 62 and an outer face 64 the side edges of which are bent to form flanges 70. Flanges 70 having an inner face 72 and an outer face 74 which when assembled in accordance with an aspect of the present invention at each end of enclosure base 30 form an environmentally qualified Weatherproof Enclosure as more fully described below. The top edge of endcap 60 is bent over to form an outwardly positioned laterally extending flange 76 the end of which is bent to form a downwardly positioned laterally extending return flange 78 having an endcap hinge pin aperture 80a, 80b, for alignment with a correspondingly positioned cover hinge pin aperture 114a, 114b (FIG. 4) as more fully described below. The bottom edge of endcap 60 is bent outwardly to form an outwardly extending flange 66 having mounting holes 68 for securing the Weatherproof Enclosure to its installed location.

Figure 9:
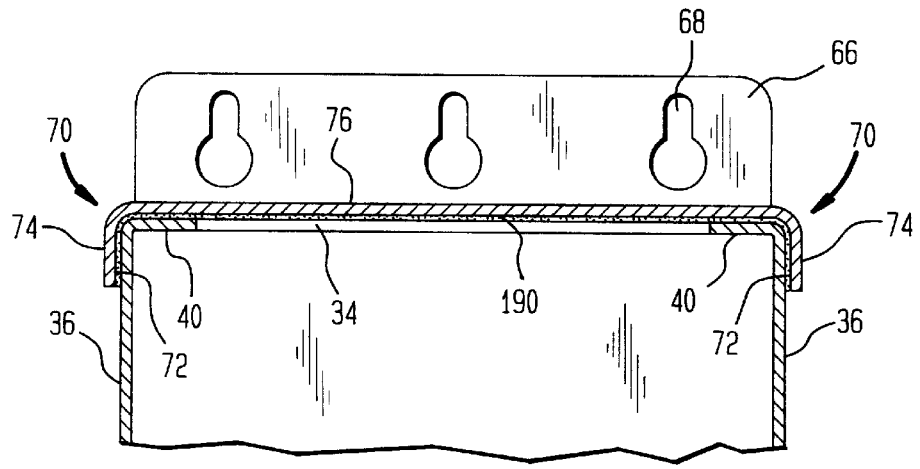
FIG. 9 is a horizontal sectional view taken along line 9—9 of the Enclosure shown in FIG. 11.

In accordance with one aspect of the present invention, the inwardly extending flanges 70 and inner wall 62 of endcap 60 overlap with sidewalls 36, upward flange 34 and inwardly extending flanges 40. (FIG. 9) The overlapping of these members as shown in FIG. 9 provides a protected contact area between the enclosure base 30 and the endcap 60 along the entire edge of enclosure base 30. In accordance with the present invention, a sealant 190 is used to seal the endcaps to the base in a novel way to achieve an environmentally qualified Weatherproof Enclosure. During assembly, sealant 190 is placed on this overlapping ridge between the flanges and the base thereby sealing the endcap to the base. The relative position of flanges 34, 40, 70 of the endcap 60 and the base 30 provides a barrier which protects the sealant from any mechanical force that might otherwise tear or break the seal. (FIG. 9).

Such tearing or breakage can occur accidentally in prior art designs during installation or removal of interior components, wiring, maintenance, or repair. Thus, endcap inwardly extending flanges that extend toward and surround and overlap the U-shaped edges of the base, provide a protective barrier from both the exterior and the interior along the entire endcap. Accordingly, such a design precludes environmental failure of the enclosure 30 due to a breach of either a mechanical component or sealant 190 between the endcaps and the base of the enclosure.

In accordance with another aspect of the present invention, the door/cover 100 of Weatherproof Enclosure 10 has a particular contour or "draw" that is shaped as a result of testing done on prior art devices during the Research and Development Program. Referring to FIGS. 1 and 4, cover/door 100 has been designed to resist the impact of high pressure hose directed water and to deflect it away from the cover/door due to the graduated slope and contour of cover/door.

The "draw" or contour in the cover/door 100 shown in FIGS. 1, 2, 3, 4 has selected to improve the resistance to the ingress of water to the interior of Weatherproof Enclosure 10 by providing surfaces 102, 103, 104, 105, and 106 which deflect the water impinging upon the Enclosure without distortion or deflection of the cover/door as is typical in the prior art.

As previously discussed, the cover/door of the prior art designs deflected or deformed inward creating an internal partial vacuum which promoted water ingress into the enclosure by the flow of water either through a breach in a weather gasket that had failed or the vacuum pulling of water past the weather gasket into the interior of the enclosure.

The "draw" or contour in cover/door 100 of the present invention deflects the impinging water to preclude the failure of the gasket between the base and the cover/door and precludes creating a partial vacuum within the enclosure as is typical in the prior art.

The exterior surface of cover/door 100 has an elevated generally rectangular face 103 substantially parallel to the bottom 32 which is connected to a flat planar rim 110 at two of its borders by ribs 106. The other sides of face 103 are connected by shoulder 102 having a curved shape and which itself is connected to rim 110. The other side of face 103 connects to gradually sloping surface 104 which itself is also connected at two of its other borders by ribs 106. Second gradually sloping surface 105 connects on one of its edges to surface 104 on two of its edges to ribs 106, and on its last edge to rim 110.

The ends of cover/door 100 are bent over to form return flanges 112a, 112b, 112c, and 112d which are directed toward the bottom 32 and extend around the outer perimeter of rim 110 on all four sides. Each of flanges 112a and 112b has a cover hinge pin aperture 114a and 114b, respectively. When cover/door 100 is positioned for assembly with enclosure 30, cover hinge pin aperture 114a is aligned with endcap hinge pin aperture 80a and rivet 200 is installed. At the same time, cover hinge pin aperture 114b is aligned with endcap hinge pin aperture 80b and rivet 200 is installed. Thus, in accordance with the present invention, the integrally formed portion of the hinge in the door/cover and the integrally formed remaining portion of the hinge in the endcap of the enclosure assures the precise location of the axis of the hinge and position of rivets 200 on the Weatherproof Enclosure. By integrally incorporating one-half of the hinge mechanism in the cover/door and integrally incorporating the other half of the hinge mechanism in the enclosure, the use of welding and riveting operations and other mechanical fastening means are avoided.

As stated above, cover/door 100 has a cover hinge pin aperture integrally included on each of its ends which receives a pin 200 and around which the cover/door rotates when opening or closing. The return flanges 112a and 112b have cover hinge pin apertures 114a and 114b, respectively, which align with each of a corresponding aperture positioned on the outer return flange of the endcap as shown in FIGS. 11 and 12. Since the aperture on the door/cover is precisely located and the apertures on the endcaps are similarly precisely located, controlled and precise hinge location on the cover/door and enclosure is obtained so that a precise axis of rotation of the cover/door to the enclosure is obtained and maintained during the operating life of Water Proof Enclosure 10.

By providing and maintaining a precise axis of rotation of the pin extending through the colinearly positioned axis of the apertures in the endcaps and the cover/door, proper compression of the gasket against the flange area of the endcaps and the base enclosure is obtained when the cover is closed as will be discussed further below. By being able to maintain proper compression of the gasketing during its operating life, the environmental integrity of the Weatherproof Enclosure is maintained throughout its design lifetime.

By precisely securing the cover/door to the enclosure, the error created by prior art welding or other means of fastening the hinge to an otherwise completely formed door is eliminated. Typically, the assembly of the cover/door to the enclosure is accomplished in the prior art by and with the aid of manufacturing fixtures that inherently cannot and do not provide the accuracy needed to ensure proper hinge location. Thus, when the hinge is not aligned precisely in accordance with design and manufacturing tolerances provided by the prior art, it can result in abrogating the design bases and thereby result in failure under environmental loading. For example, too little or too great a degree of deflection of the weather sealing gasket positioned on the edges of the enclosures of prior art designs can render the gasket of the enclosure as ineffective or failed.

Referring to FIG. 5, a gasket for weather sealing the cover/door to the enclosure is affixed to the inside of cover/door 100. More particularly, as shown in FIG. 5, gasket material 108 is positioned continuously on the inside surface of rim 110 on the exterior face of cover/door 100 and extends to flanges 112a, 112b, 112c, and 112d.

In accordance with another aspect of the present invention, flanges 38 and 76 form a continuous surface completely around the perimeter of the walls of the enclosure. This continuous surface provides a compression surface for the gasket attached to the underside of the cover to provide the proper compression of the gasketing when the cover is closed. Gasket 108 which mounts inside the cover is made in a preferred embodiment of a closed cell neoprene meeting environmental requirements and standards and mates with the compression surface formed by flanges 38 and 76 to provide a weatherproof enclosure in accordance with the present invention when the cover is closed.

While the foregoing description and drawings represent the preferred embodiments of the present invention, it will be apparent to those skilled in the art that various changes and modifications may be made therein without departing from the true spirit and scope of the present invention.

We claim:

1. A weatherproof enclosure for electrical load centers, switches or electrical components comprising a main enclosure base, two enclosure endcaps, and a hingeably mounted cover door for providing access to the interior of the weatherproof enclosure wherein:

the main enclosure base includes a generally U-shaped member having a bottom and opposing longitudinally extending sidewalls bent up from the edges of and extending orthogonally upward from the base forming an enclosure with an open top, the opposing longitudinally extending sidewalls having an outwardly extending flange extending orthogonally from the sidewalls and formed from bending over a top portion of the sidewalls, the sidewalls and the bottom having edges having inwardly bent flanges at each of their ends;

each one of the two enclosure endcaps positioned at an end of the main enclosure base and having a wall with a top edge a bottom edge and two side edges where the side edges are bent in at their ends to form side flanges having an inner face and an outer face, the top edge is bent over to form a laterally extending flange extending in an opposite direction to the side flanges, the end of said laterally extending flange being bent to form a downwardly extending return flange orthogonal to the laterally extending flange, the downwardly extending return flange having an endcap hinge pin aperture for alignment with a correspondingly positioned cover hinge pin aperture, the bottom edge of the endcap being outwardly bent to form an outwardly extending flange having a mounting hole for securing the weatherproof enclosure to an installation location;

the hingeably mounted cover door having an exterior surface having an elevated generally rectangular face substantially parallel to the bottom and connected to a flat planar rim at two of its borders by ribs, and connected to the flat planar rim at a third edge by a first shoulder having a curved shape, the generally rectangular face connected to a gradually sloping surface at a fourth edge, the first shoulder being connected at two opposite sides to the flat planar rim by the ribs, the gradually sloping surface being connected on two of its sides to the flat planar rim by the ribs and being connected on a fourth side by a second gradually sloping surface connected on two of its sides to the flat planar rim by the ribs and being connected on a fourth side by the flat planar rim, the flat planar rim being bent over at its outer edges to form door return flanges which extend around the perimeter of the rim, two of the door return flanges each having a cover hinge pin aperture which align with each of the two endcap hinge pin apertures and through each extending a rivet; the door return flanges dimensioned to overlap the outwardly extending flanges of the sidewalls of the base and the downwardly extending return flanges of the endcaps;

the cover door further having a gasket affixed to an inside surface of the rim which extends to the door return flanges in order to form a weatherproof seal around the base and endcaps when the hingeably mounted cover is closed.

2. The enclosure as in claim 1 wherein an adhesive is placed on the inwardly bent flanges at the ends of the bottom and on the inwardly bent flanges at the ends of the sidewalls of the main enclosure base and on the inner face of the endcap.

3. The enclosure as in claim 2 wherein an adhesive is placed on the inner face of the side flanges of the endcaps at an overlap with the sidewalls of the main enclosure base.

4. The enclosure as in claim 1 wherein an adhesive is placed on the inner face of the side flanges of the endcaps at an overlap with the sidewalls of the main enclosure base.

5. The enclosure as in claim 1 wherein the gasket is positioned on the inside surface of the rim so that when the door is closed, the gasket is pressed against the outwardly extending flanges of the base and the laterally extending flanges of the endcaps.

6. The enclosure as in claim 2 wherin the gasket is positioned on the inside surface of the rim so that when the door is closed, the gasket is pressed against the outwardly extending flanges of the base and the laterally extending flanges of the endcaps.

7. The enclosure as in claim 3 wherein the gasket is positioned on the inside surface of the rim so that when the door is closed, the gasket is pressed against the outwardly extending flanges of the base and the laterally extending flanges of the endcaps.

8. The enclosure as in claim 5 wherein the outwardly extending flanges of the base and the laterally extending flanges of the endcaps provide a compression surface for the gasket for compression of the gasket when the cover is closed.

9. The enclosure as in claim 8 wherein the gasket is of a closed cell neoprene material.

* * * * *